United States Patent [19]
Bell et al.

[11] Patent Number: 5,492,505
[45] Date of Patent: Feb. 20, 1996

[54] VEHICLE VENTILATION VALVE WITH IMPROVED BACK FLOW PREVENTION

[75] Inventors: Clark D. Bell, Troy; James C. Ostrand, Lenox, both of Mich.

[73] Assignee: General Motors Corporation, Detroit, Mich.

[21] Appl. No.: 316,428

[22] Filed: Sep. 30, 1994

[51] Int. Cl.⁶ ........................................................ B60H 1/26
[52] U.S. Cl. .......................................... 454/162; 137/855
[58] Field of Search ........................... 137/512.1, 512.15, 137/852, 855; 454/162, 164, 165

[56] References Cited

U.S. PATENT DOCUMENTS 4,667,578  5/1987  Hagenah ................................. 454/164
4,691,623  9/1987  Mizusawa .
4,781,106  11/1988 Frien .
4,989,499  2/1991  Scoccia et al. .
5,085,132  2/1992  Ikeda .
5,105,731  4/1992  Kraus ................................. 454/162 X
5,263,895  11/1993 Kraus et al. ............................ 454/162

Primary Examiner—Harold Joyce
Attorney, Agent, or Firm—Patrick M. Griffin

[57] ABSTRACT

A flap type vehicle ventilation valve improves sealing, while still preventing flap blowthrough, by insetting the surface of the blowthrough prevention valves from the plane of the vent opening. Therefore, under normal negative pressure, the flap can bulge inwardly from the plane of the vent opening, but not hit the webs, so that puckering of the flap and the consequent backflow leakage is prevented. The webs still hit the flap in response to high negative pressures, to avoid flap blowthrough.

2 Claims, 3 Drawing Sheets

VEHICLE VENTILATION VALVE WITH IMPROVED BACK FLOW PREVENTION

This invention relates to vehicle ventilation valves in general, and specifically to such a valve of the type that uses a flap type seal.

BACKGROUND OF THE INVENTION

Vehicle interiors are continually fed with outside air drawn in by the vehicle's ventilation, heating and cooling system, generally called an HVAC system. Interior air must be continually vented, therefore, to maintain an interior pressure balance, which is typically done through a one way valve. Backflow through the valve is undesirable, because backflow air will not be conditioned to the desired temperature and humidity, and may carry particulates and dust.

Ventilation valves can be electro mechanical devices that respond actively to pressure differentials, but these are expensive and complex. A more common valve is a passively acting one way device that vents excess interior pressure, but closes off automatically to prevent backflow. One such valve is a simple duck bill device, as shown in U.S. Pat. No. 4,691,623 to Mizusawra. Duck bill valves open and close quickly, but have a very limited opening area and venting capacity. A more common type of passive valve uses one or two thin, flexible rubber flaps that sit on an inclined frame, with the flaps' own weight holding them down to cover a large area vent opening. Excess interior pressure easily lifts the flaps to allow quick venting through the large vent opening, while the flaps own weight quickly closes it once a pressure balance is restored. An example of such a flap type ventilation valve may be seen in co-assigned U.S. Pat. No. 4,781,106. Because of the large potential venting area, a flap valve can work quickly. The extreme flexibility of the thin flap requires that support webs be provided to prevent it from getting sucked back through the vent opening and sticking. The support webs cross the vent opening like a window frame, and effectively divide it up into numerous smaller area openings, as may be seen in FIG. 1 of the last cited patent. While the support webs are needed, they threaten seal integrity whenever the flap faces a negative pressure, which causes it to bulge inwardly. At the T shaped junctions where the webs intersect the edge of the vent opening, the lip of the flap can be lifted or puckered locally, allowing some back flow leakage.

The problem of back flow with thin rubber flaps has been recognized, as in recently issued U.S. Pat. No. 5,085,132. The solution proposed there is simply to provide a filter to catch particulates carried in by the backflow air. This, of course, entails extra cost, and does not prevent the ingress of air that is too hot or cold, or too wet. It would be far preferable to deal with the root cause of backflow leakage per se, especially if it could be done at no extra cost.

SUMMARY OF THE INVENTION

The invention provides a flap type ventilation valve that gives improved back flow prevention with no added cost.

In the embodiment disclosed, a pair of large area, generally rectangular vent openings in a rigid plastic frame are each defined by a flat, sharp edged sealing shoulder. Each vent opening is inclined from the vertical, and divided up into smaller areas by a plurality of support webs that span it. However, the flat outer surfaces of the webs lie in a plane that is deliberately slightly inset from, not flush with, the plane of the sealing shoulder. The flaps covering the vent openings are thin, flexible rubber sheets, which overlap the sealing shoulder around three edges, with a hinge at the top edge. When the flap faces a normal negative pressure, it can bulge inwardly to an extent, without hitting the support webs. Therefore, nothing acts to buckle or pucker the flap along the shoulder. Tight, continuous sealing contact with the shoulder is maintained. Should a higher than normal negative pressure occur, the flap can still hit the support webs, so that it does not blow through. The overlap of the flap edge with the shoulder is sufficient to prevent it from being dragged off of the shoulder when the flap is bulged inwardly by the negative pressure. The quick acting response of a thin, light flap is maintained, and sealing efficiency is improved, but there is no extra cost involved in molding the support webs with an inset.

DESCRIPTION OF THE PREFERRED EMBODIMENT

These and other objects and features of the invention will appear from the following written description, and from the drawings, in which.

Figure 1:
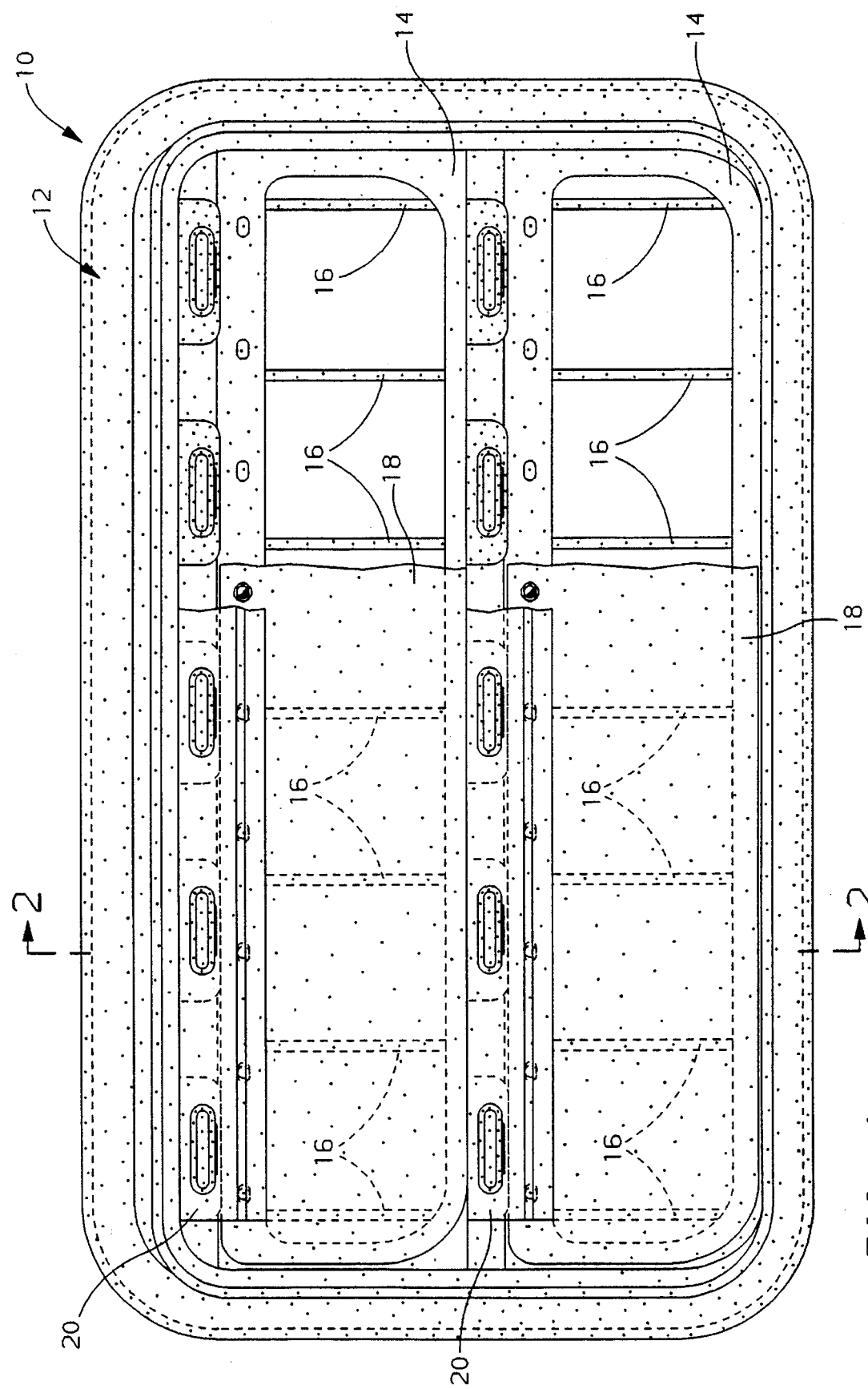
FIG. 1 is a plan view of a preferred embodiment of the invention, with the flaps partially broken away to reveal the underlying vent openings' sealing shoulders and support webs.
Figure 5:
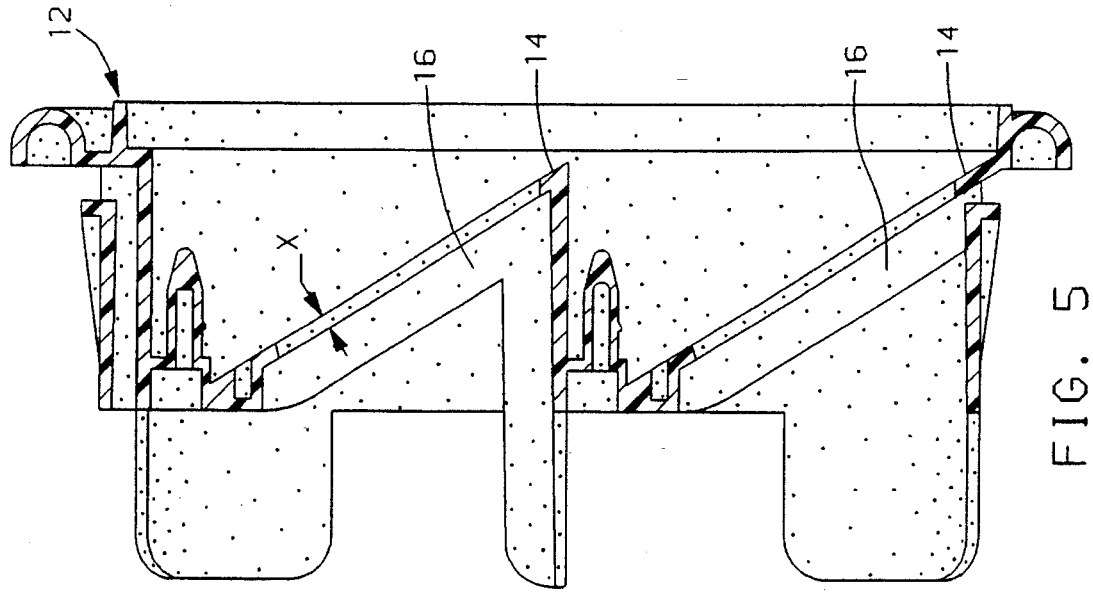
FIG. 5 is a cross section like 2—2, but showing just the frame.

Referring first to FIGS. 1 and 5, a preferred embodiment of the invention, indicated generally at 10, includes a frame 12, molded of a rigid plastic, such as talc filled polypropylene. Frame 12 would snap fit into a non illustrated vehicle body panel at a non visible location, with its left side (as viewed in FIG. 5) facing the vehicle interior. Frame 12 includes two generally rectangular vent openings, each defined by a flat, sharp edged perimeter sealing shoulder 14, which is radiused at the corners. Each shoulder 14 encloses a vent opening that is approximately 160 by 32 mm, in the embodiment disclosed, so a fairly large total vent area is available. The plane in which each shoulder 14 lies is inclined approximately 30 degrees from vertical, for a reason described below. The area of the vent openings enclosed by the shoulders 14 is, as seen from the perspective of FIG. 1, spanned by seven equally spaced webs 16, which run transverse or perpendicular to the vent opening enclosed by shoulder 14. Unlike a conventional valve, however, the outer surfaces of the webs 16 lie in a plane that is parallel to, but inset from, the plane of the shoulder 14. The inset is best seen in FIG. 5, labeled at X, and is about 2 mm in the embodiment disclosed. The depth of inset X is related to the pressure response of another valve component, described next.

Figure 2:
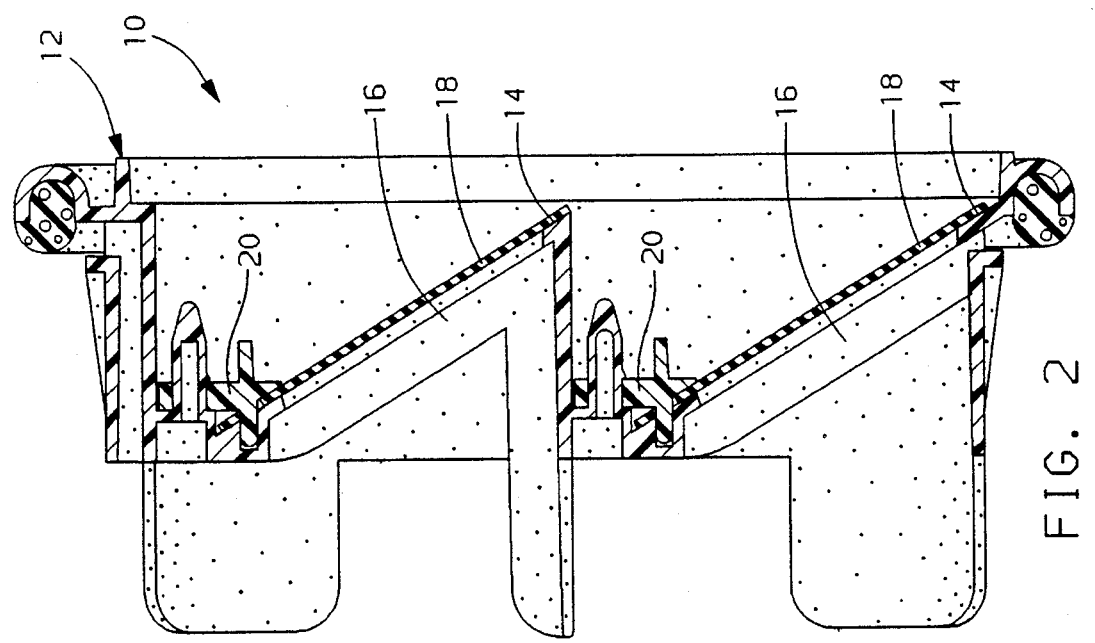
FIG. 2 is a cross section through 2—2, showing a basically neutral pressure balance.

Referring next to FIGS. 1 and 2, a pair of flaps 18, each comprising a thin EPDM rubber sheet about 0.5 mm in thickness, are each slightly larger than the area enclosed by each sealing shoulder 14. Each flap 18 is pinned tightly by a clamp 20 along its top edge, and the rest of its perimeter covers sealing shoulder 14 with about a 2 mm continuous overlap. As best seen in FIG. 2, the incline from vertical allows the flaps 18 to rest under their own weight against the sealing shoulders 14 when there is no significant differential between interior and exterior pressure. The flaps 18 remain flat and undeformed in the absence of a pressure differential, and do not touch the webs 16.

Figure 3:
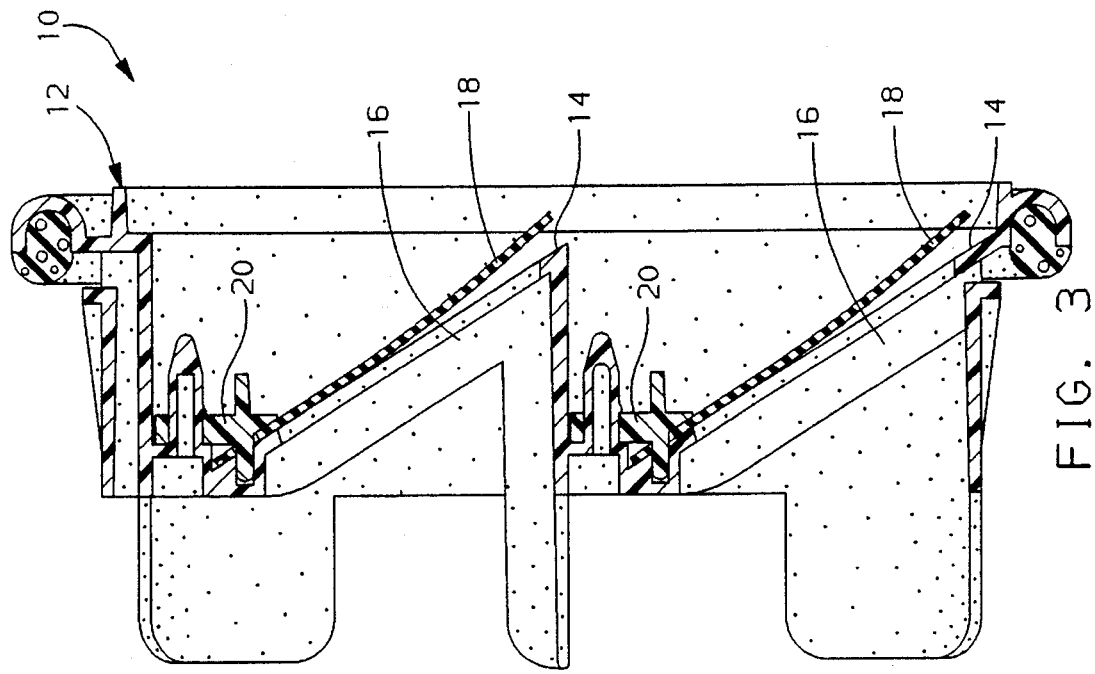
FIG. 3 is a view like FIG. 2, but showing a positive interior pressure, lifting the valve flaps away from the sealing shoulders to vent to the exterior.

Referring next to FIGS. 2 and 3, the response of valve 10 to positive pressure differentials is illustrated. As air is drawn into the vehicle interior by the HVAC system, its pressure tends to rise. The thinness and lightness of the flaps 18 allow them to be easily and quickly flipped up and out from the FIG. 2 to the FIG. 3 position. A large venting area is uncovered, and excess interior pressure can quickly vent out, as shown by the arrows. Once released, the weight of the flaps 18 causes them to settle quickly back down on the inclined planes of the sealing shoulders 14. Therefore, there is not much reverse or back flow that results from the flaps 18 simply closing. The potential problem comes with the response of flap 18 to a negative pressure differential, illustrated next.

Figure 4:
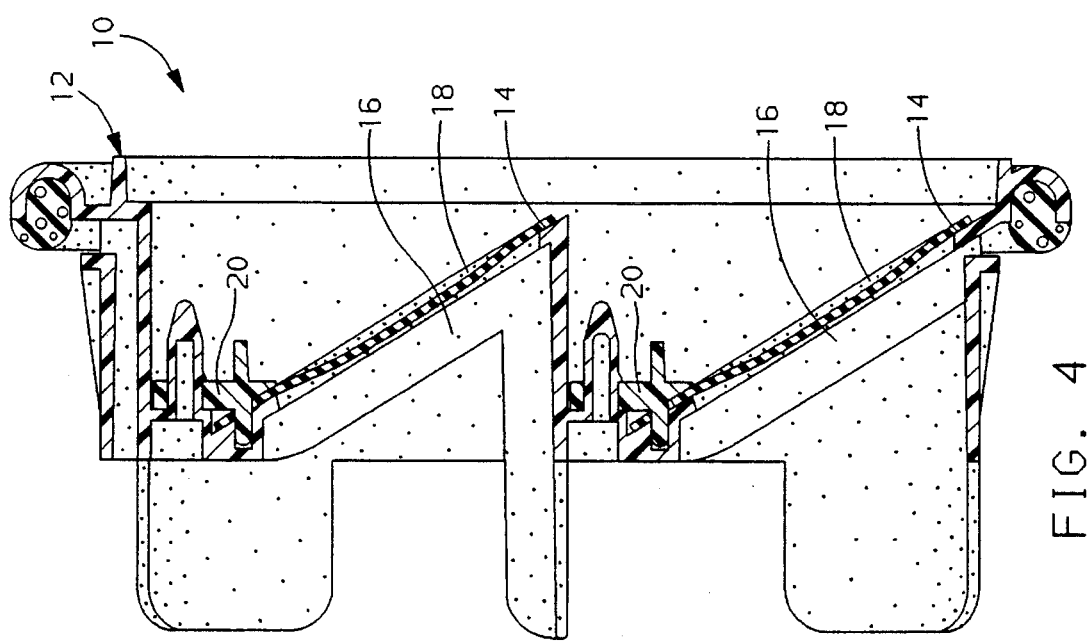
FIG. 4 is a view like FIG. 2, but showing the flaps inwardly bulged under a normal negative interior pressure.

Referring next to FIG. 4, when pressure outside the vehicle relatively rises, due to temperature changes or other causes, there is a net pressure that pushes on the outside of the flaps 18, as shown by the arrows. The thin and light quality of the flap 18 that allows for its quick opening and closing response time also makes it subject to an inward bulging or depression in response to the negative pressure. The normal spread of negative pressure differentials that can be expected would be in the range of approximately 0.02 to 0.04 psi. The inset of approximately 2 mm is enough, for the particular flap 18 disclosed, to prevent it from bulging inwardly far enough to hit the webs 16, under normal negative pressure fluctuations. Consequently, the edge of flap 18 is pressed harder against shoulder 14, but there is nothing to make it pucker or lift away from the surface of the shoulder 14 at any point. Therefore, backflow leakage is prevented, or at least reduced. The overlap of the edge of flap 18 with shoulder 14 is enough to prevent it from pulling off of the shoulder 14 as it bulges in. Under very high negative pressures, flap 18 would bulge in farther. In that case, however, it will eventually hit the webs 16, before the edge of flap 18 pulls past the shoulder 14. Flap 18 is thereby prevented from blowing through, as in a conventional ventilation valve. Hitting the webs 16 could cause some localized puckering of and leakage past the edge of flap 18, of course. However, this will occur only when very high pressure depressions occur, not every time a negative pressure occurs, as in a conventional valve. Therefore, overall, net leakage is greatly reduced. Valve 10 is no more costly than a conventional valve, since the blow through prevention webs 16 can be molded with an inset as easily as without.

Variations in the embodiment disclosed could be made. As long as the flap contacting surface of shoulder 14 lies in a plane, it need not be flat in cross section. It could, for example, by given a raised, rounded lip, the uppermost surface of which lay in a plane, and was still inset from the surfaces of the webs 16. Such a configuration could potentially give an even tighter seal. The flat shoulder 14 is particularly simple, however. Only one, or more than two, flaps like 18 could be incorporated, depending on the venting capacity needed. The webs 16 could run in any pattern across shoulder 14, even zigzagged or lengthwise, so long as they backed enough of the flap 18 to prevent blowthrough. Therefore, it will be understood that it is not intended to limit the invention to just the embodiment disclosed.

The embodiments of the invention in which an exclusive property or privilege is claimed are defined as follows:

1. A one way vehicle interior ventilation valve with improved back flow prevention, comprising:

a frame having a continuous, planar sealing shoulder surrounding and defining a vent opening, said frame further having a plurality of webs spanning the vent opening enclosed by said sealing shoulder, the outer surfaces of said webs lying in a plane inset from the plane of said sealing shoulder by a predetermined inset, and, a generally planar, flexible sealing flap overlying said sealing shoulder, said predetermined inset being sufficiently large to allow said flap to bulge inwardly slightly under back flow pressure, so that said flap remains engaged with said sealing shoulder without interruption, said web surfaces engaging said inwardly bulged flap before said flap bulges inwardly sufficiently to pull past said sealing shoulder.

2. A one way vehicle interior ventilation valve with improved back flow prevention, comprising:

a frame having a continuous, flat, planar sealing shoulder surrounding and defining a vent opening, said frame further having a plurality of transverse webs spanning the width of said vent opening enclosed by said sealing shoulder, the outer surfaces of said webs lying in a plane inset from the plane of said sealing shoulder by a predetermined inset, and, a generally planar, flexible sealing flap overlying said sealing shoulder, said predetermined inset being sufficiently large to allow said flap to bulge inwardly slightly under back flow pressure, so that said flap remains engaged with said sealing shoulder without interruption, said web surfaces engaging said inwardly bulged flap before said flap bulges inwardly sufficiently to pull past said sealing shoulder.

\* \* \* \* \*